(No Model.)

D. S. WHITE.
BELL CORD COUPLING.

No. 363,266. Patented May 17, 1887.

WITNESSES:
C. Neveux
C. Sedgwick

INVENTOR:
D. S. White
BY Munn & Co.
ATTORNEYS.

N. PETERS, Photo-Lithographer, Washington, D. C.

UNITED STATES PATENT OFFICE.

DAVID SMILEY WHITE, OF HUNTLEY, ILLINOIS.

BELL-CORD COUPLING.

SPECIFICATION forming part of Letters Patent No. 363,266, dated May 17, 1887.

Application filed March 10, 1887. Serial No. 230,389. (No model.)

*To all whom it may concern:*

Be it known that I, DAVID SMILEY WHITE, of Huntley, in the county of McHenry and State of Illinois, have invented a new and Improved Bell-Cord Coupling, of which the following is a specification, reference being had to the annexed drawings, forming a part thereof, in which—

Figure 1:
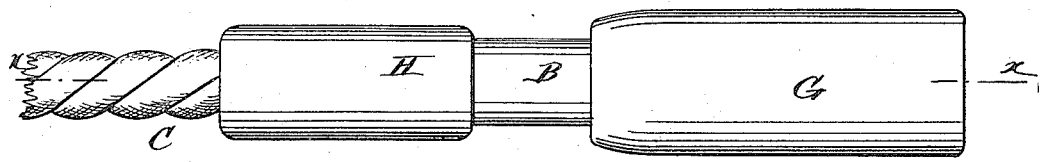
Figure 2:
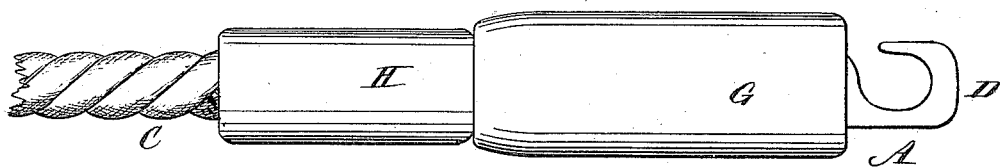
Figure 3:
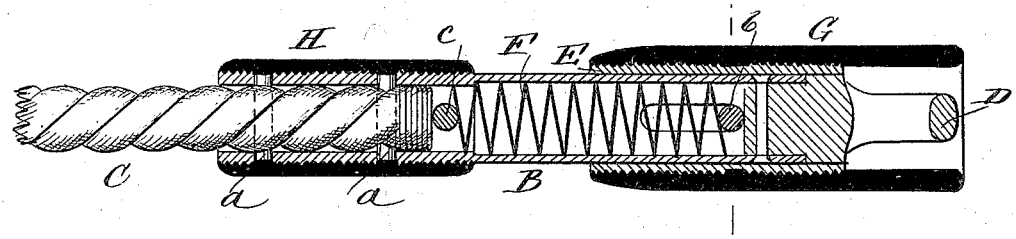
Figure 4:
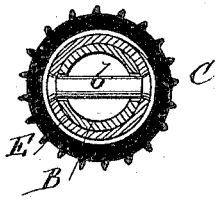

Figure 1 is a side elevation of a bell-cord coupling embodying my improvement, showing the hook of the coupling covered by an elastic shield. Fig. 2 is a side elevation of the coupling with the elastic shield withdrawn. Fig. 3 is a longitudinal section taken on line $x$ $x$ in Fig. 1, and Fig. 4 is a transverse section taken on line $y$ $y$ in Fig. 3.

Similar letters of reference indicate corresponding parts in all the views.

The object of my invention is to provide a movable elastic covering for the hooks of bell-cords employed on railway-trains, to prevent the breakage of the car-windows by the striking of the coupling against the window.

My invention consists in a hook provided with a sliding spring-actuated metallic sleeve carrying an elastic sleeve capable of projecting beyond the end of the hook in the coupling and of being withdrawn, so as to expose the hook while the cords are being coupled, all as hereinafter more fully described.

The coupling A is provided with the tubular shank B, in one end of which is inserted the bell-cord C, which is secured by rivets $a$ or in any other convenient way. In the opposite end of the tubular shank B is inserted a hook, D, of the form usually employed in connecting the bell-cords of railway-trains. To the outside of the tubular shank B is fitted a sleeve, E, which is adapted to slide freely on the shank, and is provided with a pin, $b$, passing transversely through slots $c$ in opposite sides of the tubular shank. In the tubular shank B is placed a spiral spring, F, which abuts against a pin, $c$, passing transversely through the shank and presses against the pin $b$, so as to force the sleeve E toward the hook D.

The outer surface of the sleeve E is screw-threaded or otherwise roughened, and upon it is placed an elastic sleeve, G, which projects beyond the end of the sleeve E sufficiently to inclose the hook D when the sleeve E is in its outer position. The end of the tubular shank B which incloses the end of the cord C is also screw-threaded or otherwise roughened, and upon it is placed an elastic covering, H. The covering H and the sleeve G are preferably made of soft rubber; but any other substance having a yielding quality may be employed. When the sleeve E is in its normal position, with the elastic sleeve G inclosing the hook D, the striking of the coupling against the windows of the car, or against the finished wood-work, or the lamps, does no injury, on account of the elastic nature of the sleeve G and covering H.

When it is desired to couple or uncouple the cord C, it is only necessary to slide back the sleeve E, together with the elastic sleeve G, when the cord may be coupled or uncoupled in the usual way.

To increase the elasticity of the sleeve G and to facilitate handling the coupling, I may employ a longitudinally-ribbed sleeve, as shown in Fig. 4.

Having thus fully described my invention, I claim as new and desire to secure by Letters Patent—

1. In a bell-cord coupling, the combination, with the hook D, of an elastic sleeve adapted to automatically slide over and protect the hook, substantially as described.

2. In a bell-cord coupling, the combination of the hook D, provided with the tubular shank B, the spring-actuated sleeve E, and the elastic sleeve G, secured to the sleeve E and projecting over and inclosing the hook D, substantially as described.

3. In a bell-cord coupling, the combination of the slotted tubular shank B, the hook D, the sleeve E, the spring F, placed in the tubular shank and adapted to press the sleeve E forward, and the elastic sleeve G, placed upon or secured to the sleeve E, substantially as described.

4. The combination, with the hook D, of the sleeve E, carrying the elastic sleeve G, having longitudinal ribs projecting from its surface, substantially as described.

5. As an improved article of manufacture, a bell-cord coupling formed of the tubular shank B, the hook D, the sleeve E, fitted to the tubular shank, the elastic sleeve G, the spring F, and the elastic covering H, combined and arranged substantially as described.

DAVID SMILEY WHITE.

Witnesses:
T. B. SCHERMERHORN,
W. G. SAWYER.